(12) United States Patent
Wyle

(10) Patent No.: US 7,610,227 B2
(45) Date of Patent: Oct. 27, 2009

(54) SYSTEM AND METHOD FOR CREATING CROSS-REFERENCE LINKS, TABLES AND LEAD SHEETS FOR TAX RETURN DOCUMENTS

(75) Inventor: David A. Wyle, Newport Coast, CA (US)

(73) Assignee: SurePrep, LLC, Newport Beach, CA (US)

( * ) Notice: Subject to any disclaimer, the term of this patent is extended or adjusted under 35 U.S.C. 154(b) by 818 days.

(21) Appl. No.: 10/903,637

(22) Filed: Jul. 30, 2004

(65) Prior Publication Data

US 2006/0026083 A1 Feb. 2, 2006

(51) Int. Cl.
G06F 17/22 (2006.01)
(52) U.S. Cl. .................................................... 705/31
(58) Field of Classification Search .................. 705/31
See application file for complete search history.

(56) References Cited

U.S. PATENT DOCUMENTS

| | | | |
|---|---|---|---|
| 4,754,326 A | 6/1988 | Kram et al. |
| 5,054,096 A | 10/1991 | Beizer |
| 5,144,115 A | 9/1992 | Yoshida |
| 5,404,294 A * | 4/1995 | Karnik | ........................ 715/236 |
| 5,737,599 A | 4/1998 | Rowe et al. |
| 5,787,295 A | 7/1998 | Nakao |
| 5,878,215 A | 3/1999 | Kling et al. |
| 5,923,842 A | 7/1999 | Pedersen et al. |
| 5,940,811 A | 8/1999 | Norris |
| 5,963,926 A | 10/1999 | Kumomura |
| 6,003,019 A | 12/1999 | Eaton et al. |
| 6,009,442 A | 12/1999 | Chen et al. |
| 6,012,050 A | 1/2000 | Eaton et al. |
| 6,021,400 A | 2/2000 | Gallacher et al. |
| 6,128,633 A | 10/2000 | Michelman et al. |
| 6,144,380 A | 11/2000 | Shwarts et al. |
| 6,173,285 B1 | 1/2001 | Nishita et al. |
| 6,202,052 B1 | 3/2001 | Miller |
| 6,209,095 B1 | 3/2001 | Anderson et al. |
| 6,226,752 B1 | 5/2001 | Gupta et al. |
| 6,237,011 B1 | 5/2001 | Ferguson et al. |
| 6,272,484 B1 | 8/2001 | Martin et al. |
| 6,298,357 B1 | 10/2001 | Wexler et al. |
| 6,311,165 B1 | 10/2001 | Coutts et al. |

(Continued)

OTHER PUBLICATIONS

MSPivot, Microsoft Office Excel PivotTable reports 101, downloaded on Sep. 14, 2008 from http://office.microsoft.com/enus/excel/HA010346321033.aspx?ac=, 12 pages.*

(Continued)

Primary Examiner—F. Zeender
Assistant Examiner—Paul Danneman
(74) Attorney, Agent, or Firm—Snell & Wilmer L.L.P.

(57) ABSTRACT

A processor-based method for creating a set of work papers with cross-reference links to tax documents. The method may include receiving a tax document, displaying a page of the tax document, receiving a form type corresponding to the page of the tax document, and receiving a form name corresponding to the page of the tax document. The method may also include displaying a plurality of categories related to the form type, selecting a category from the plurality of categories, providing a link corresponding to the selected category, and receiving a number corresponding to the link.

16 Claims, 10 Drawing Sheets

U.S. PATENT DOCUMENTS

| | | | |
|---|---|---|---|
| 6,338,138 B1 | 1/2002 | Raduchel et al. | |
| 6,369,811 B1 | 4/2002 | Graham et al. | |
| 6,473,741 B1 | 10/2002 | Baker | |
| 6,476,930 B1 | 11/2002 | Roberts et al. | |
| 6,480,866 B2 | 11/2002 | Mastie | |
| 6,510,466 B1 | 1/2003 | Cox et al. | |
| 6,539,479 B1 | 3/2003 | Wu | |
| 6,567,628 B1 | 5/2003 | Guillemin et al. | |
| 6,567,789 B1 | 5/2003 | Baker | |
| 6,572,661 B1 | 6/2003 | Stern | |
| 6,584,505 B1 | 6/2003 | Howard et al. | |
| 6,598,023 B1 | 7/2003 | Drummond et al. | |
| 6,601,173 B1 | 7/2003 | Mohler | |
| 6,721,783 B1 | 4/2004 | Blossman et al. | |
| 6,957,384 B2 | 10/2005 | Jeffery et al. | |
| 7,171,615 B2 * | 1/2007 | Jensen et al. | 715/222 |
| 7,234,103 B1 | 6/2007 | Regan | |
| 7,257,553 B1 | 8/2007 | Baker | |
| 2001/0044762 A1 * | 11/2001 | Nault | 705/30 |
| 2002/0161698 A1 | 10/2002 | Wical | |
| 2002/0161796 A1 | 10/2002 | Sylthe | |
| 2003/0036912 A1 * | 2/2003 | Sobotta et al. | 705/1 |
| 2003/0061131 A1 * | 3/2003 | Parkan, Jr. | 705/30 |
| 2003/0163547 A1 | 8/2003 | Beisty et al. | |
| 2004/0150854 A1 | 8/2004 | Sprague et al. | |
| 2004/0216057 A1 | 10/2004 | Wyle et al. | |
| 2004/0225581 A1 | 11/2004 | Wyle et al. | |
| 2004/0243626 A1 | 12/2004 | Wyle et al. | |
| 2005/0038722 A1 | 2/2005 | Throndson et al. | |
| 2005/0102283 A1 * | 5/2005 | Anderson et al. | 707/4 |
| 2006/0155618 A1 | 7/2006 | Wyle | |
| 2006/0178961 A1 | 8/2006 | Stanley et al. | |
| 2007/0033118 A1 | 2/2007 | Hopkinson | |
| 2008/0082432 A1 | 4/2008 | Baker | |
| 2008/0319882 A1 | 12/2008 | Wyle | |

OTHER PUBLICATIONS

IntelliTax for Windows and DOS, Accounting Technology, v 18, n9, p38, Oct. 2002.*

Harvey, Greg. Adobe Acrobat 5 PDF For Dummies, 2002, Wiley Publishing, Inc., pp. 13-34.

* cited by examiner

Fig. 3

| a Control number | 22222 | | OMB No. 1545-0008 | |
|---|---|---|---|---|
| b Employer identification number 342 - 658710 | | | 1 Wages, tips, other compensation 100,000R | 2 Federal income tax withheld   37   15,000R |
| c Employer's name, address, and ZIP code FLY BY NIGHT INC. | | | 3 Social security wages 84,900 | 4 Social security tax withheld 5,264.8R |
| | | | 5 Medicare wages and tips 100,000 | 6 Medicare tax withheld 1,451R |
| d Employee's social security number 111 - 11 - 111 | | | 7 Social security tips | 8 Allocated tips |
| e Employee's first name and initial JANET | Last name REYNOLDS | | 9 Advance EIC payment | 10 Dependent care benefits |
| 14205, ALPINE ROAD BIG BEAR CITY, CA 90888 | | | 11 Nonqualified plans | 12a Code D   10,500 |
| | | | 13 Statutory employee / Retirement plan / Third-party sick pay | 12b Code |
| | | | 14 Other | 12c Code |
| f Employee's address and ZIP code | | | | 12d Code |
| 15 Employer's state ID number CA | 16 State wages, tips, etc. 100,000 | 16 State income tax 5,000R | 18 Local wages, tips, etc. | 19 Local income tax | 20 Locality name |

PAGE 38

Fig. 4

| a Control number | 22222 | Void | For Official Use Only ▶ OMB No. 1545-0008 | | |
|---|---|---|---|---|---|
| b Employer identification number 354 - 6894302 | | | | 1 Wages, tips, other compensation 80,000R | 2 Federal income tax withheld  37   12,000R |
| c Employer's name, address, and ZIP code ABC INC. | | | | 3 Social security wages 80,000 | 4 Social security tax withheld 4,960R |
| | | | | 5 Medicare wages and tips 80,000 | 6 Medicare tax withheld 1,162R |
| | | | | 7 Social security tips | 8 Allocated tips |
| d Employee's social security number 999 - 99 - 9991 | | | | 9 Advance EIC payment | 10 Dependent care benefits |
| e Employee's first name and initial TOM | | Last name REYNOLDS | | 11 Nonqualified plans | 12a See instructions for box 12 |
| 14205, ALPINE ROAD BIG BEAR CITY, CA 90888 | | | | 13 Statutory employee   Retirement plan   Third-party sick pay | 12b |
| | | | | 14 Other | 12c |
| | | | | | 12d |
| f Employee's address and ZIP code | | | | | |
| 15 Employer's state ID number CA \| | 16 State wages, tips, etc. 80,000 | 16 State income tax 4,000R | 18 Local wages, tips, etc. | 19 Local income tax | 20 Locality name |

PAGE 39

Fig. 5

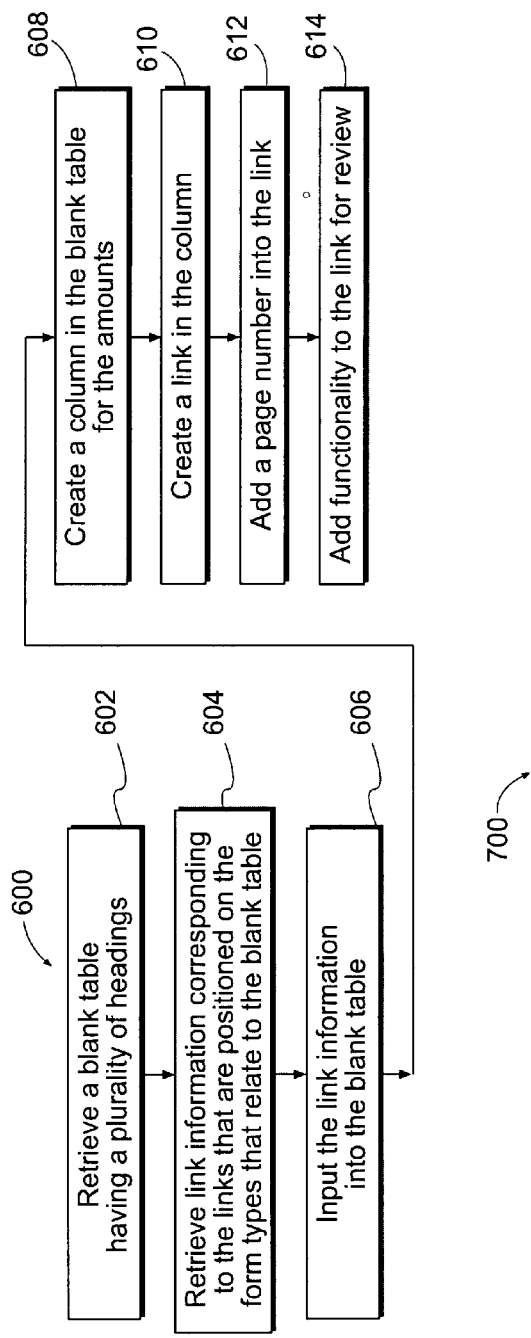

| Form 1040 page 1 | | | | | | |
|---|---|---|---|---|---|---|
| Line # | Description | From | Lead sheet | Per Return | Variance | Comment |
| Line 7 | Wages, salaries | 37 | 180,000 | 180,000 | – | |
| Line 8a | Taxable interest | 40 | 7,221 | 7,221 | – | |
| Line 8b | Tax-exempt interest | 45 | 105,136 | 105,136 | – | |
| Line 9 | Ordinary dividends | 46 | 40,753 | 40,753 | – | |
| Line 10 | Taxable refunds | 76 | 3,220 | 3,220 | – | |
| Line 11 | Alimony received | | | | – | |
| Line 12 | Business income | | 0 | | – | |
| Line 13 | Capital gain | 55 | 246,655 | 246,542 | (113) | Section 1202 50% exclusion of $225- Charles Schwab |
| Line 14 | Other gains - 4797 | | | | – | |
| Line 15a | IRA distributions | | | | – | |
| Line 15b | Taxable amount | 50 | 15,000 | 15,000 | – | |
| Line 16a | Pension & annuities | | | | – | |
| Line 16b | Taxable amount | | | | – | |
| Line 17 | Rental real estate, Flow-Through | 58 | (38,892) | (38,892) | – | |
| Line 18 | Farm Income | | | | – | |
| Line 19 | Unemployment compensation | | | | – | |
| Line 20a | Social Security benefits | | | | – | |
| Line 20b | Taxable amount | | | | – | |
| Line 21 | Other income | 52 | | | – | |
| Line 22 | Total income | | 453,957 | 453,844 | (113) | |
| | | | | | | |
| Line 23 | Educator expenses | | | | – | |
| Line 24 | IRA deduction | | | | – | |
| Line 25 | Student loan interest deduction | | | | – | |
| Line 26 | Tuition and fees deduction | | | | – | |
| Line 27 | Archer MSA deduction | | | | – | |
| Line 28 | Moving expenses | | | | – | |
| Line 29 | One-half self-employment tax | | | | – | |
| Line 30 | Self-employed health insurance | | | | – | |
| Line 31 | Self-employed SEP, SIMPLE.. | | | | – | |
| Line 32 | Penalty on early withdrawal | | | | – | |
| Line 33a | Alimony paid | | | | – | |
| Line 34 | Add lines 23 - 33a | | 0 | | – | |
| Line 35 | Adjusted gross income | | 453,957 | 453,844 | (113) | |

Fig. 8a

| Form 1040 page 2 | | | | | | |
|---|---|---|---|---|---|---|
| Line # | Description | From | Lead sheet | Per Return | Variance | Comment |
| Line 36 | Adjusted gross income | | 453,957 | 453,844 | 75 (113) | |
| Line 38 | Itemized deduction or std. deduction | 75 | 22,862 | 22,862 | - | |
| Line 39 | Substract line 38 from line 36 | | 431,095 | 430,982 | (113) | |
| Line 40 | Exemption amount | T/R | 0 | 0 | - | |
| Line 41 | Taxable income | | 431,095 | 430,982 | (113) | |
| Line 42 | Tax | T/R | 120,865 | 120,865 | - | |
| Line 43 | Alternative minimum tax | | | | - | |
| Line 44 | Add lines 42 and 43 | | 120,865 | 120,865 | - | |
| Line 45 | Foreign tax credit | 90 | 678 | 332 | (346) | Lead shows foreign tax |
| Line 46 | child/dependent care credit | 88 | 480 | 480 | - | Assumption-qualified for |
| Line 47 | Credit for the elderly or disabled | | | | - | |
| Line 48 | Education credit | | | | - | |
| Line 49 | Retirement savings contri. Credit | | | | - | |
| Line 50 | Child tax credit | | | | - | |
| Line 51 | Adoption credit | | | | - | |
| Line 52 | Credits from (Form 8396 & Form 8859) | | | | - | |
| Line 53 | Other credits | | | | - | |
| Line 54 | Total credits | | 1,158 | 812 | (346) | |
| Line 55 | Substract line 54 from line 44 | | 119,707 | 120,053 | 346 | |
| | | | | | - | |
| Line 56 | Self-employment tax | T/R | | | - | |
| Line 57 | Social security & medicare tax on tips | | | | - | |
| Line 58 | Tax on qualified plans | | | | - | |
| Line 59 | Advance earned income credit payment | | | | - | |
| Line 60 | Household employment taxas | | | | - | |
| Line 61 | Total tax | | 119,707 | 120,053 | 346 | |
| | | | | | - | |
| Line 62 | Federal income tax withheld | | 30,538 | 30,538 | - | |
| Line 63 | 2002 estimated tax payments & applied | | - | | - | |
| Line 64 | Earned Income credit (EIC) | | | | - | |
| Line 65 | Excess Social Security tax | | | | - | |
| Line 66 | Additional child tax credit | T/R | | | - | |
| Line 67 | Amount paid with extension | | 0 | | - | |
| Line 68 | Other payments | | | . | - | |
| Line 69 | Total payments | | 30,538 | 30,538 | 0 | |
| Line 70 | Amount overpaid | | 0 | | 0 | |
| Line 71 | Amount refunded | | | | 0 | |
| Line 72 | Amount applied to next year estimates | | | | 0 | |
| Line 73 | Amount owed | | 92,047 | 92,343 | 346 | |
| Line 74 | Estimated tax penalty | T/R | 2,878 | 2,878 | | |

Fig. 8b

Table of Contents

| | |
|---|---:|
| Review Status Summary | 3 |
| Form 1040 | 4 |
| GENERAL INFORMATION | 6 |
|   Cpa Forms | 6 |
|     2002 TAX ORGANIZER | 7 |
|     ENGAGEMENT LETTER | 8 |
|   Client Information | 12 |
|     QUESTIONNAIRE | 12 |
|     ORGANIZER PAGE - PERSONAL INFORMATION, DEPENDENTS | 16 |
|   Estimated Taxes | 17 |
|     ORGANIZER PAGE | 17 |
|   Others | 18 |
|     ORGANIZER PAGE - ELECTRONIC FILING AND WITHDRAWAL A | 18 |
|     ORGANIZER PAGE - CALIFORNIA INFORMATION | 19 |
| CONSOLIDATED ITEMS | 20 |
|   1099 Consolidated | 20 |
|     CHARLES SCHWAB & CO. INC. - 1234-5678 | 20 |
|   Settlement Statements | 34 |
|     SOUTH SHORE SAVINGS BANK | 34 |
|   Others | 36 |
|     ORGANIZER PAGE - IRA INFORMATON | 36 |
| INCOME | 37 |
|   W-2 | 37 |
|     W-2 - FLY BY NIGHT INC. | 38 |
|     W-2 - ABC INC. | 39 |
|   Interest | 40 |
|     ORGANIZER PAGE - INTEREST INCOME | 41 |
|     1099 INT - MORGAN STANLEY | 43 |
|     1099 INT - MERRILL LYNCH | 44 |
|     1099 INT - BEAR STERNS | 45 |
|   Tax Exempt Interest | 46 |
|     ORGANIZER PAGE | 46 |
|   Dividend | 47 |
|     ORGANIZER PAGE - DIVIDEND INCOME | 48 |
|   Pensions, Ira, W-2g | 50 |
|     1099R - FIDELITY INVESTMENTS | 51 |
|   Misc. Income | 52 |
|     ORGANIZER PAGE | 53 |
|     FORM 1099-G - CALIFORNIA STATE REFUND | 54 |
|   Sch. D - Dispositions | 55 |
|     ORGANIZER PAGE | 57 |
|   Sche. E - Rental & Royalty | 58 |
|     ORGANIZER PAGE | 60 |

Fig. 9a

```
    ORGANIZER PAGE - DETAIL DEPRECIATION ........................... 62
    1098 - INDY MAC BANK, F.S.B. ............................................... 63
  K-1's ................................................................................................ 64
    ORGANIZER PAGE .................................................................. 67
    1120S - RAYMONDS INC. ....................................................... 69
    1065 - SEA RESTAURANT ...................................................... 71
    1065 - SEA FALCON, LLC ....................................................... 73

DEDUCTIONS ..................................................................................... 75
  Itemized Deductions ..................................................................... 75
    ORGANIZER PAGE - MEDICAL AND TAXES ........................ 83
    ORGANIZER PAGE - MORTGAGE INTEREST ..................... 84
    ORGANIZER PAGE - CONTRIBUTIONS .................................. 85
    ORGANIZER PAGE - MISCELLANEOUS ................................. 86
    ORAGNIZER PAGE - EMPLOYEE BUSINESS EXPENSES ........ 87

CREDIT ............................................................................................... 88
  Dependent Care Credit (2441) ........................................................ 88
    ORGANIZER PAGE ................................................................. 89
  Foreign Tax Credit (1116) ............................................................... 90
    ORGANIZER PAGE ................................................................. 91

UNUSED ITEMS .................................................................................. 92
```

Fig. 9b

SYSTEM AND METHOD FOR CREATING CROSS-REFERENCE LINKS, TABLES AND LEAD SHEETS FOR TAX RETURN DOCUMENTS

FIELD OF THE DISCLOSURE

The invention relates generally to creating cross-reference information for tax return documents, and more particularly to systems and methods for creating cross-reference links, tables and lead sheets for tax return documents.

BACKGROUND

Tax return documents are received from many different sources such as an employer, partnership, investment firm, charity, and so on. These documents may be forwarded to a tax preparer who prepares an income tax return for an individual or a business. Once the income tax return has been completed, the tax preparer can check the income tax return for accuracy and completeness by reviewing and cross-referencing the tax return documents. However, this task may be burdensome and difficult because the tax preparer has to look through every single tax return document to check the accuracy and completeness of each entry in the income tax return. Also, this task is time consuming because the review process is performed without having any cross-reference documents or numbers.

Alternatively, the tax preparer can manually write in a cross-reference number for each entry in the income tax return; however, this task is also very burdensome, difficult and time consuming because the tax preparer may have to write in dozens of cross-reference numbers. Furthermore, this task may need to be redone each time a change is made to the income tax return. Also, this task may need to be updated each time another tax return document is submitted by the individual or business.

Accordingly, it should be appreciated that there is a need for a system and method for creating cross-reference links, tables and lead sheets for tax return documents in an automated fashion to increase the efficiency of checking the accuracy and completeness of income tax returns. The invention fulfills this need as well as others.

SUMMARY OF THE INVENTION

One embodiment of the invention is a processor-based method for creating a cross-reference link for a tax document. The method may include receiving a tax document, displaying a page of the tax document, receiving a form name corresponding to the page of the tax document, and receiving a company name corresponding to the page of the tax document. The method may also include displaying a plurality of categories related to the form name, selecting a category from the plurality of categories, providing a link corresponding to the selected category, and receiving a number corresponding to the link.

BRIEF DESCRIPTION OF THE DRAWINGS

The exact nature of this invention, as well as the objects and advantages thereof, will become readily apparent from consideration of the following specification in conjunction with the accompanying drawings in which like reference numerals designate like parts throughout the figures thereof and wherein:

FIG. 3 is a graphical user interface (GUI) illustrating a view area for displaying a page of the electronic document and a forms area for displaying a plurality of titles corresponding to a plurality of forms according to an embodiment of the invention;

FIG. 4 is a page of the electronic document illustrating a W-2 document for FLY BY NIGHT according to an embodiment of the invention;

FIG. 5 is a page of the electronic document illustrating a W-2 document for ABC according to an embodiment of the invention;

FIG. 6 is a simplified flow diagram illustrating a method for creating reference pages or work papers for tax return documents according to an embodiment of the invention;

FIG. 7 is an example of a wages lead sheet for a form 1040 tax return that has been created using the W-2 documents from FLY BY NIGHT (FIG. 4) and ABC (FIG. 5) according to an embodiment of the invention;

FIGS. 8a and 8b are an example of a tax return reconciliation page for a form 1040 tax return according to an embodiment of the invention; and FIGS. 9a and 9b are an example of a table of contents page for a form 1040 tax return according to an embodiment of the invention.

DETAILED DESCRIPTION

Reference will now be made to the preferred embodiments of the invention, examples of which are illustrated in the accompanying drawings. While the invention will be described in conjunction with the preferred embodiments, it will be understood that these embodiments are not intended to limit the scope of the invention. On the contrary, the invention is intended to cover alternatives, modifications and equivalents, which may be included within the spirit and scope of the invention as defined by the appended claims. In the following detailed description, numerous specific details are set forth in order to provide a thorough understanding of the invention. However, it will be understood by one skilled in the art that the invention may be practiced without these specific details. In other instances, well known systems, components, methods and procedures have not been described in detail so as not to unnecessarily obscure the important aspects of the invention. As will be appreciated, various embodiments of the invention are described herein and shown in the figures. The term link and reference may be used interchangeably in certain instances in this disclosure.

Figure 1:
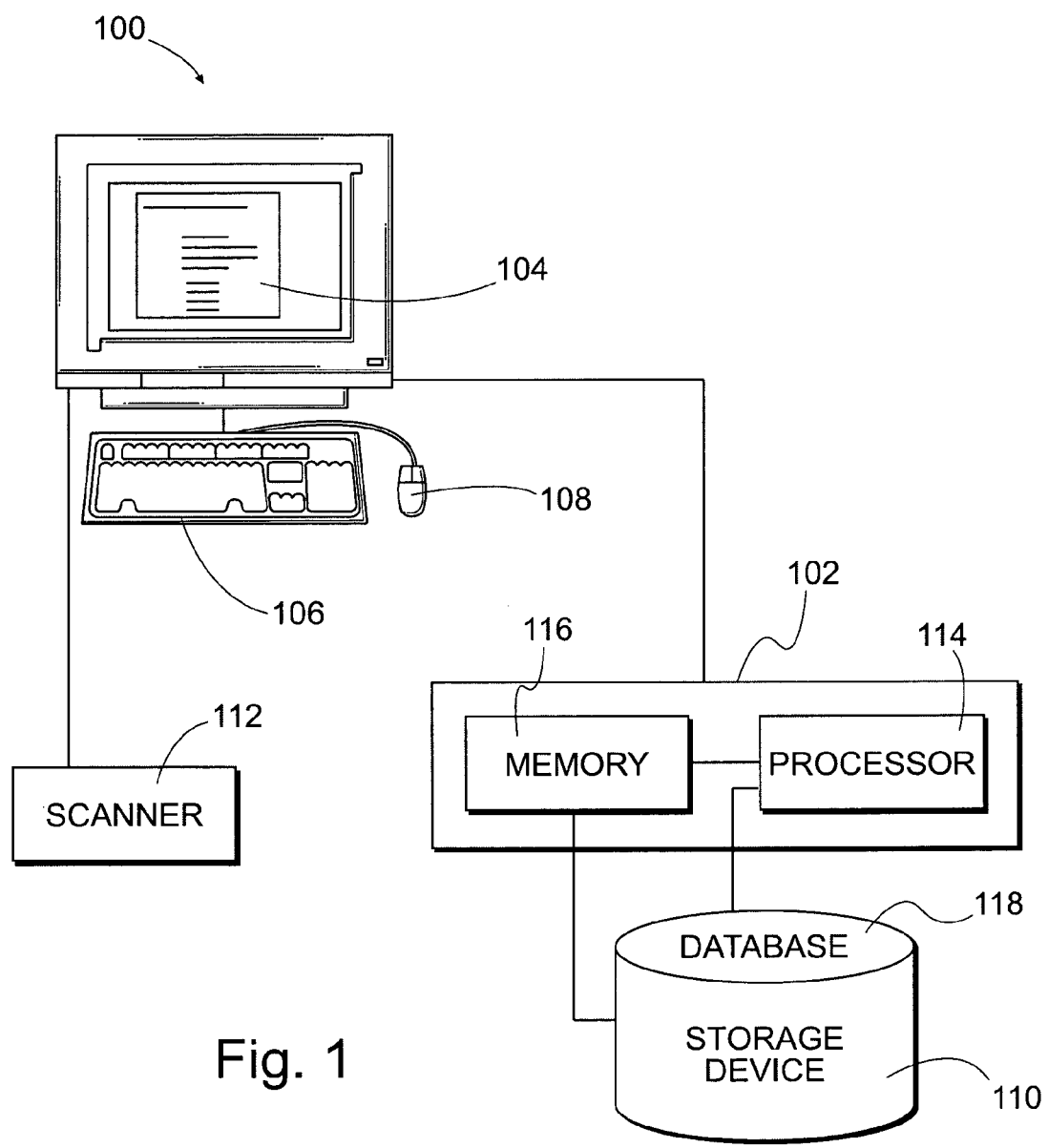
FIG. 1 is a simplified block diagram of a computer system having a software program for creating cross-reference links, tables and lead sheets for tax return documents according to an embodiment of the invention.

FIG. 1 is a simplified block diagram of a computer system 100 having a software program for creating cross-reference links, tables and lead sheets for tax return documents. The computer system 100 (e.g., a personal computer, hand-held device or workstation) includes a digital computer 102, a display screen 104, a keyboard 106, a mouse 108 or other pointing device, a storage device 110 (e.g., a hard disk drive, optical disk drive, magnetic disk drive or floppy disk drive), and a scanner 112. The digital computer 102 may include a processor 114, a memory 116 (e.g., RAM, ROM or cache), and other customary components (e.g., memory bus and peripheral bus). The software program is generally stored in the storage device 110 or the memory 116 and is executed by the processor 114. In one embodiment, tax software files containing proformaed data is stored in the storage device 110 or the memory 116. The software program can also be implemented using hardware or a combination of hardware and software. The storage device 110 can be referred to as a machine-readable medium, which may be any mechanism that provides (i.e., stores and/or transmits) information in a form readable by the digital computer 102 (e.g., the processor 114). For example, the machine-readable medium may be a read only memory (ROM), a random access memory (RAM), a cache, a hard disk drive, a floppy disk drive, a magnetic disk storage media, an optical storage media, a flash memory device or any other device capable of storing information. The storage device 110 may include a database 118 that can be used to store, arrange and retrieve data from the storage device 110.

Figure 2:
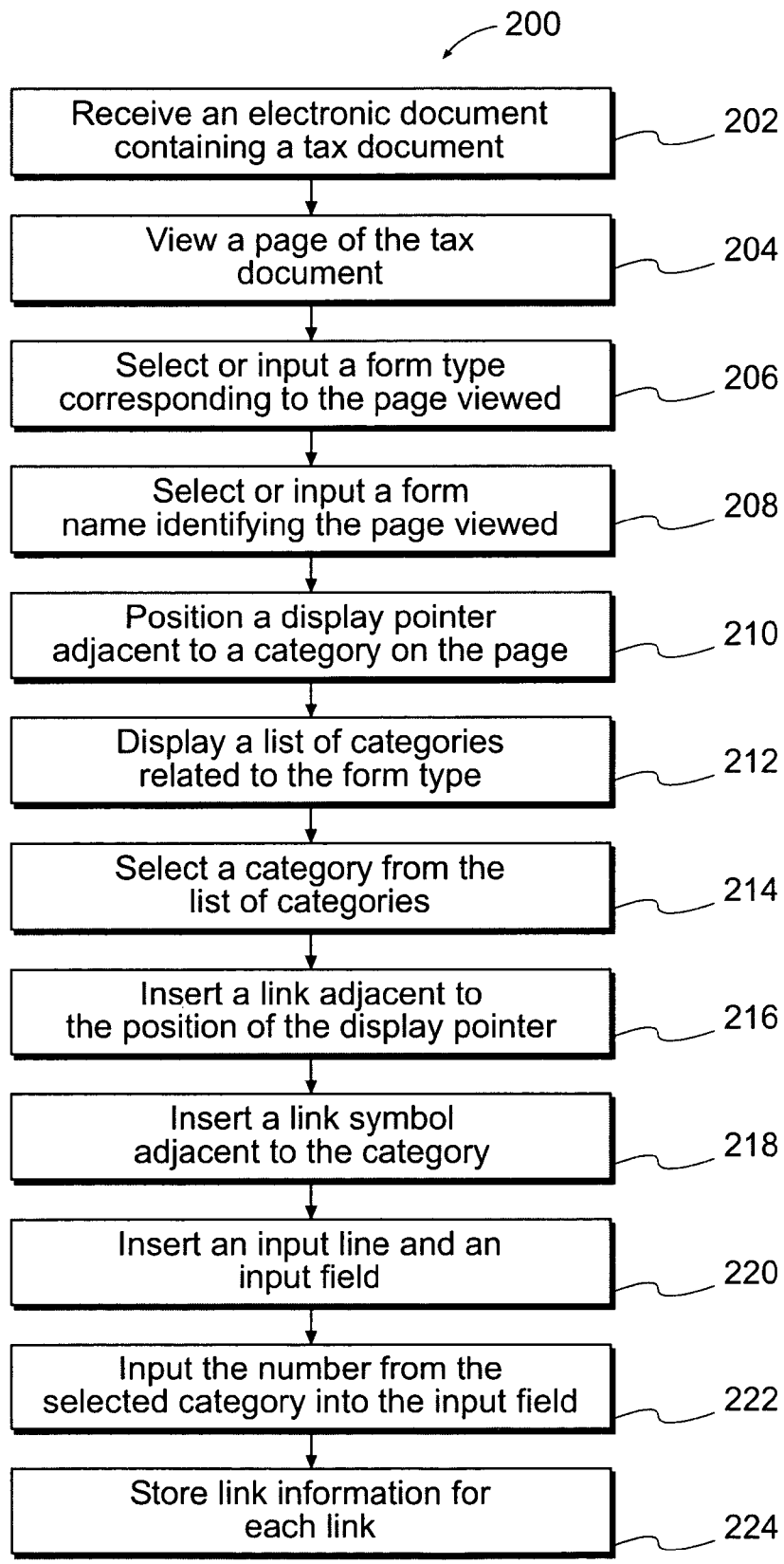
FIG. 2 is a simplified flow diagram illustrating a method for creating cross-reference links for tax return documents according to an embodiment of the invention.

FIG. 2 is a simplified flow diagram 200 illustrating a method for creating cross-reference links for tax return documents. Tax return documents (e.g., W-2s, 1099s, K-1s, and so on) are generally in the form of paper documents that are received by a tax payer shortly after the end of each calendar year. Upon receipt by the tax payer, the tax return documents are forwarded to a tax preparer for review and preparation of a tax return. To allow the tax preparer to work on the tax return documents using the computer system 100, the documents are sometimes scanned into a single electronic document, such as a portable document format (PDF) document or file, using the scanner 112 (S-202). The single electronic document allows the tax preparer to work on the tax return documents from anywhere at anytime. The electronic document is typically arranged as a sequence of individual pages where each page can have objects, such as text, graphics, images, color spaces, annotations, and so on. A document viewing software program, such as Adobe Acrobat from Adobe Systems Incorporated of San Jose, Calif., can be used to view the electronic document (S-204). Once scanned in, the tax return documents can be used to create documents (e.g., table of contents, lead sheets, tax reconciliation pages, etc.) to assist the tax preparer in efficiently preparing and reviewing the tax return.

Figure 3:
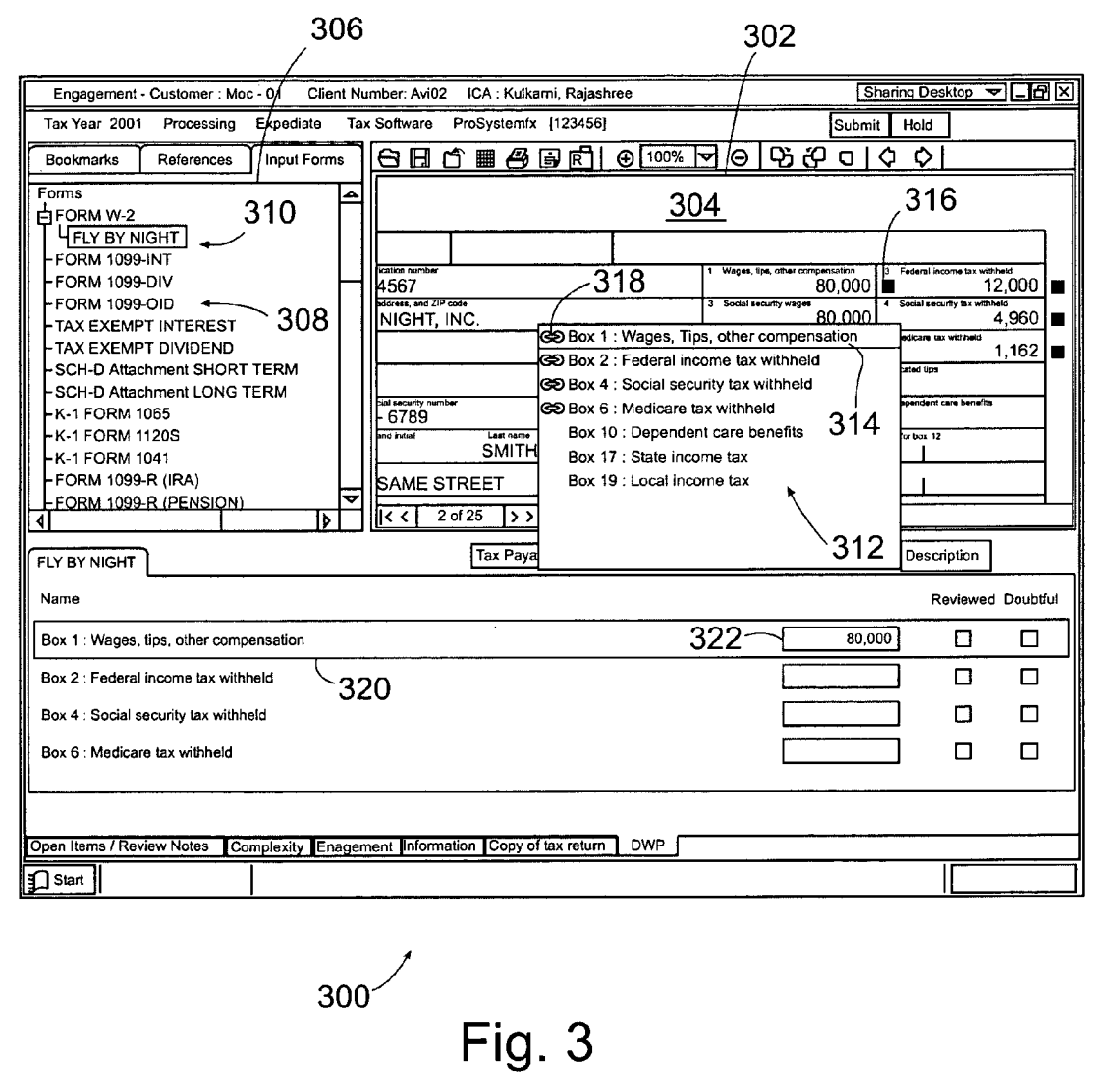

FIG. 3 is a graphical user interface (GUI) 300 illustrating a document view area 302 for displaying a page 304 of the electronic document and a forms view area 306 for displaying a plurality of form types 308 corresponding to a plurality of forms. After the tax return documents are scanned in, a classifier may view the page 304 of the electronic document, and may select or input a form type 308 corresponding to the page 304 being displayed in the document view area 302 (S-206). The page(s) of the electronic document that belong to a form type 308 are sometimes referred to as a document set (e.g., Set1, Set2, Set3, and so on). Hence, the electronic document is broken up into a number of document sets. The document sets are generally auto numbered beginning with Set1 by the computer system 100.

The classifier may be the computer system 100 or an individual capable of selecting the appropriate form type 308 and inputting the appropriate form name 310 for each page or group of tax return documents. The form name can be selected from a list of preexisting form names 310 or can be added by inputting a form name 310 representing the form name desired. In the illustrated example, the form types 308 include W-2, 1099-INT, 1099-DIV, 1099-OID, TAX EXEMPT INTEREST, TAX EXEMPT DIVIDEND, SCH-D Attachment SHORT TERM, SCH-D Attachment LONG TERM, K-1 FORM 1065, K-1 FORM 1120S, K-1 FORM 1041, FORM 1099-R (IRA), FORM 1099-R (PENSION), and so on. The forms corresponding to the form types 308 may be created by retrieving the proformaed data from the tax files and importing the proformaed data into the database 118. The computer system 100 associates the document sets to the proformaed forms. That is, one or more pages in the electronic document may be related to a proformaed form.

Once the form type 308 has been selected, the classifier may input or if already input, may select a form name 310 identifying the document or page 304 being displayed in the document view area 302 (S-208). In the illustrated example, the W-2 form type 308 and the FLY BY NIGHT form name 310 have been selected because the displayed page 304 is a FLY BY NIGHT W-2 document.

Once the form type 308 and the form name 310 have been selected, a referencer causes the computer system 100 to insert one or more links or references on the pages of the electronic document. The referencer may be an individual capable of causing the computer system 100 to insert or display one or more links or references on the pages of the electronic document. For example, for each category on the displayed page 304, the referencer, via the mouse 108, positions a display pointer adjacent to (e.g., to the right of) the category and double click a left mouse button to display a list of categories 312 (e.g., in a popup menu) specifically related to the selected form type (S-210, S-212). The list of categories 312 for a W-2 form type 308 may include (1) Wages, tips, other compensation, (2) Federal income tax withheld, (3) Social security withheld, (4) Medicare tax withheld, (5) Dependent care benefits, (6) State income tax, and (7) Local income tax. The referencer selects a category 314, from the list of categories 312 displayed, corresponding to the category adjacent to the position of the display pointer (S-214). For example, the referencer may select (1) Wages, tips, other compensation after positioning the display pointer adjacent to (e.g., to the right of) that category on the page of the electronic document.

Once selected, the computer system 100 inserts, enables or displays a link 316 at or near the position of the display pointer (S-216) on the displayed page 304 and a link symbol 318 adjacent to the category 314 on the popup menu to indicate that the link 316 has been placed on the displayed page 304 (S-218). Also, for each link 316 added adjacent to an amount, the computer system 100 inserts, enables or displays an input line 320 and an input field 322 corresponding to the selected category 314 on the displayed page 304 (S-220). The referencer or a data entry operator inputs the number from the selected category 314 into the input field 322 (S-222). As shown in FIG. 3, the number input is 80,000. In one embodiment, the computer system 100 retrieves the number from the linked category on the displayed page 304 and inserts the number into the input field 322. The computer system 100 stores link information for each link 316 in the storage device 110 (S-224). The link information may include the form type 308 corresponding to the link 316, the form name 310 corresponding to the link 316, the page number of the electronic document corresponding to the link 316, the amount or data corresponding to the link 316, the physical location of the link 316, and so on. Depending on the company's business model, the classifier, the referencer and the data entry operator may be one or more individuals or may be implemented using the computer system 100. Steps S-210 through S-224 can be repeated to create a link 316 for each category on the popup menu.

FIG. 4 is a page of the electronic document illustrating a W-2 document for FLY BY NIGHT. Initially, the classifier viewed the W-2 document and selected the W-2 form type 308 corresponding to the W-2 document displayed in the document view area 302. Thereafter, the classifier input the FLY BY NIGHT form name 310 to identify the name of the W-2 document. Using the mouse 108, the referencer caused the computer system 100 to input a link R at or near the position of the display pointer. As shown, the links R have been placed adjacent to the selected category 314. For each link R, the link information (e.g., page 38, etc.) is stored in the storage device 110. The "R" has been used for illustrative purposes only to represent the link 316. Generally, the link 316 is shown as a block with a number inside the block where the number indicates the page number that the information has been obtained from.

FIG. 5 is a page of the electronic document illustrating a W-2 document for ABC. Initially, the classifier viewed the W-2 document and selected the W-2 form type 308 corresponding to the W-2 document displayed in the document view area 302. Thereafter, the classifier input the ABC form name 310 to identify the name of the W-2 document. Using the mouse 108, the referencer caused the computer system 100 to input a link R at or near the position of the display pointer. As shown, the links R have been placed adjacent to the selected category 314. For each link R, the link information (e.g., page 39, etc.) is stored in the storage device 110.

FIG. 6 is a simplified flow diagram 600 illustrating a method for creating reference pages or work papers for tax return documents. The reference pages are used to assist the tax preparer in efficiently checking the tax return documents for accuracy and completeness. For illustrative purposes, the reference pages can include, for example, a table of contents page, a tax return reconciliation page, a wages lead sheet, an interest lead sheet, and so on. In one embodiment, one or more reference pages are created for each form type 308. The reference pages may include a column of amounts and references. A reference to the left of an amount means that the data is coming from the page on the reference and a reference to the right of an amount means that the data is going to the page on the reference. The subtotal and total amounts listed on the reference pages may be copied to a tax reconciliation page.

FIG. 7 is an example of a wages lead sheet 700 for a form 1040 tax return that has been created using the W-2 documents from FLY BY NIGHT (FIG. 4) and ABC (FIG. 5). The wages lead sheet 700 can be used as a summary sheet of the wages of the tax payer. The wages lead sheet 700 is used to assist the tax preparer in efficiently checking the wages information contained in the tax payer's tax return to ensure that the information is accurate and complete.

To create the wages lead sheet 700, the processor 114 retrieves a blank wages table having a number of headings as shown in FIG. 7 from the memory 116 (S-602). Thereafter, the processor 114 retrieves the link information corresponding to the links 316 that are positioned on the form types 308 that relate to the blank wages table (S-604) and inputs the link information into the corresponding row and column of the blank wages table (S-606). For example, the wages lead sheet 700 includes a link 702 to the left of the FLY BY NIGHT title, which indicates that the information is coming from page 38. Similarly, the wages lead sheet 700 includes a link 704 to the left of the ABC title, which indicates that the information is coming from page 39. The wages lead sheet 700 also includes a link 706, which indicates that the 5,000 is going to page 76, a link 708, which indicates that the 4,000 is going to page 76, and a link 710, which indicates that the 180,000 is going to page 4. Generally, when the link is to the left of the number it is coming from a particular page and when the link is to the right of the number it is going to a particular page. In one embodiment, the computer system 100 may create a column in the blank table for the amounts (S-608). Using the link information, the computer system 100 creates a link in the column for one or more of the row entries (S-610) and adds a page number into the link (S-612). The computer system 100 may add functionality to the links for allowing the tax preparer to navigate through the electronic document (S-614). For example, the computer system 100 may allow the tax preparer to switch from one link to the next, go back and forth between links having the same page number, simultaneously display all pages with links having the same page number, and so on.

FIGS. 8a and 8b are an example of a tax return reconciliation page 800 for a form 1040 tax return. The tax return reconciliation page 800 provide a list of entries contained in the form 1040 tax return. The tax return reconciliation page 800 is created in a manner similar to that described in FIG. 6.

FIGS. 9a and 9b are an example of a table of contents page 900 for a form 1040 tax return. The tax return reconciliation page 900 provide a list of entries contained in the form 1040 tax return. The tax return reconciliation page 900 is created in a manner similar to that described in FIG. 6.

Although exemplary embodiments of the invention has been shown and described, many other changes, combinations, omissions, modifications and substitutions, in addition to those set forth in the above paragraphs, may be made by one having skill in the art without necessarily departing from the spirit and scope of this invention. Accordingly, the invention is not intended to be limited by the preferred embodiments, but is to be defined by reference to the appended claims.

What is claimed is:

1. A processor-based method for creating a set of work papers with cross-reference links to tax documents comprising:
   receiving, at a computer, a tax document;
   displaying, on a display screen, a page of the tax document;
   receiving, at the computer, a form type corresponding to the page of the tax document;
   receiving, at the computer, a form name corresponding to the page of the tax document;
   displaying, on the display screen, a plurality of categories related to the form type;
   providing, at the computer, a category selection from the plurality of categories;
   providing, at the computer, a link corresponding to the selected category;
   receiving, at the computer, a number or a description corresponding to the link;
   providing, at the computer, a tax return reconciliation template that includes a tax item description field and a tax page identifier field;
   providing, at the computer, a tax return reconciliation page by populating the tax item description field and the tax page identifier field with information from the tax document; and
   displaying, on the display screen, the tax return reconciliation page, wherein the tax page identifier field includes a clickable link to the page of the tax document containing a value corresponding to the tax item description field.

2. The method of claim 1 wherein the receiving the form type includes providing a form type selection from a plurality of form types.

3. The method of claim 1 wherein the receiving the form name includes providing a form name selection from a plurality of preexisting form names or inputting a form name.

4. The method of claim 1 further comprising positioning, on the display screen, a display pointer adjacent to one of the plurality of categories.

5. The method of claim 1 further comprising displaying, on the display screen, a link adjacent to the selected category.

6. The method of claim 1 further comprising displaying, on the display screen, a link symbol adjacent to the selected category.

7. The method of claim 1 further comprising displaying, on the display screen, an input line corresponding to the selected category.

8. The method of claim 7 wherein the input line includes an input field for receiving the number.

9. The method of claim 1 further comprising storing, on a storage device, link information related to the link.

10. A machine-readable medium that provides instructions, which when read by a processor, causes the machine to perform operations comprising:
   displaying a page of a tax document;
   displaying a form type corresponding to the page of the tax document;
   displaying a form name corresponding to the page of the tax document;
   displaying a plurality of categories related to the form type;
   providing a link corresponding to a category selected from the plurality of categories;
   inserting the link on the page of the tax document;
   generating a tax return reconciliation page by retrieving link information corresponding to the link on the page of the tax document;
   inserting a clickable link on the tax return reconciliation page to the page of the tax document containing a value corresponding to the selected category; and
   displaying the page of the tax document when the clickable link is selected.

11. The machine-readable medium of claim 10 further comprising providing a number corresponding to the link, the number representing an amount from the page of the tax document.

12. The machine-readable medium of claim 11 further comprising creating a document having the number with the link positioned adjacent to the number.

13. The machine-readable medium of claim 11 further comprising retrieving a tax return reconciliation page having a plurality of headings and inserting the number into the tax return reconciliation page at a location that relates to the category selected.

14. The machine-readable medium of claim 10 further comprising positioning a display pointer adjacent to the category selected.

15. The machine-readable medium of claim 10 further comprising displaying the link adjacent to the category selected.

16. The machine-readable medium of claim 10 further comprising displaying an input line corresponding to the category selected.

* * * * *

UNITED STATES PATENT AND TRADEMARK OFFICE
CERTIFICATE OF CORRECTION

PATENT NO. : 7,610,227 B2  Page 1 of 1
APPLICATION NO. : 10/903637
DATED : October 27, 2009
INVENTOR(S) : David A. Wyle It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1102 days.

Signed and Sealed this

Twelfth Day of October, 2010

David J. Kappos
*Director of the United States Patent and Trademark Office*